US012804725B2

(12) United States Patent
Chandrashekar

(10) Patent No.: US 12,804,725 B2
(45) Date of Patent: Nov. 17, 2026

(54) RANDOM-ACCESS CHANNEL (RACH) PROCEDURE DIFFERENTIATION AND IDENTIFICATION

(71) Applicant: Rakuten Symphony, Inc., Tokyo (JP)

(72) Inventor: Subramanya Chandrashekar, Bangalore (IN)

(73) Assignee: Rakuten Symphony, Inc., Tokyo (JP)

( * ) Notice: Subject to any disclaimer, the term of this patent is extended or adjusted under 35 U.S.C. 154(b) by 238 days.

(21) Appl. No.: 18/845,759

(22) PCT Filed: Aug. 29, 2024

(86) PCT No.: PCT/US2024/044455
§ 371 (c)(1),
(2) Date: Sep. 10, 2024

(87) PCT Pub. No.: WO2025/071852
PCT Pub. Date: Apr. 3, 2025

(65) Prior Publication Data

US 2026/0173143 A1 Jun. 18, 2026

(30) Foreign Application Priority Data

Sep. 28, 2023 (IN) ............................ 202341065273
Jul. 3, 2024 (IN) ............................ 202341065273

(51) Int. Cl.
*H04W 74/0833* (2024.01)
*H04W 36/00* (2009.01)
*H04W 72/23* (2023.01)

(52) U.S. Cl.
CPC ... *H04W 74/0833* (2013.01); *H04W 36/0072* (2013.01); *H04W 72/23* (2023.01)

(58) Field of Classification Search
None
See application file for complete search history.

(56) References Cited

U.S. PATENT DOCUMENTS

2023/0199859 A1* 6/2023 Li ......................... H04W 48/16 370/329
2024/0049293 A1* 2/2024 Lin ....................... H04L 5/0048
2025/0344252 A1* 11/2025 Lutchoomun ..... H04W 74/0833

* cited by examiner

*Primary Examiner* — Robert M Morlan
(74) *Attorney, Agent, or Firm* — David R. Stevens; Stevens Law Group

(57) ABSTRACT

Embodiments disclosed herein provide a method and system for receiving, at a first network entity and from a second network entity, a configuration message comprising a Random Access Channel (RACH) preamble, to perform a RACH procedure with a fourth network entity to perform a network function. Further, a command is received, at the first network entity and from at least one of the second network entity, to perform the network function. Furthermore, the RACH procedure is performed at the first network entity, by transmitting a RACH request message including the RACH preamble comprising an indicator, to the fourth network entity. The indicator is indicative of a network function. Moreover, the network function is performed at the first network entity, based on the received command.

20 Claims, 6 Drawing Sheets

RANDOM-ACCESS CHANNEL (RACH) PROCEDURE DIFFERENTIATION AND IDENTIFICATION

CROSS-REFERENCE TO RELATED APPLICATIONS

This application claims the benefit of Provisional Indian Patent Application No. 202341065273, filed on Sep. 28, 2023 and Indian Patent Application No. 202341065273, filed on Jul. 3, 2024, the full disclosure of which is incorporated herein by reference in its entireties for all purposes.

TECHNICAL FIELD

The present disclosure generally relates to the field of wireless communication, and more particularly relates to enabling differentiation and identification of Random Access Channel (RACH) procedure used for the purpose of acquiring timing advance (TA).

BACKGROUND

A cellular network is a telecommunication interconnection of user devices and cellular Base Station (BS), such as cell tower. A BS includes a service area which is divided into a plurality of cells. A cell defines a geographical area which is served by a transceiver antenna associated with the BS. Multiple user devices present in a particular cell, also referred as serving cell, communicate with the associated transceiver antenna of the BS on a plurality of frequencies and frequency channels.

A Radio Access Network (RAN) is part of the cellular network and is responsible for implementing radio access technology. RANs provide connection to user devices, such as a mobile phone/device, a computer, or any remotely controlled device present in the network, with a Core Network (CN). The user devices may be varyingly known as User Equipment (UE), terminal equipment, Mobile Station (MS), and the like.

While a mobile device, such as a UE, is connected to the serving cell, the mobile device performs measurements of channel parameters and signal parameters related to the serving cell as well as neighboring cells for a predefined time period. Additionally, when multiple UEs are connected to the serving cell, as UEs are not always stationary with respect to the base station, the variation in distance between UE and gNB will reflect in UL transmission time (i.e., message received at gNB). Due to the change, gNB encounters interference as UL transmission of different UE's can be overlapping. Hence a time offset, based on the distance between the serving BS and the UE is derived through measurements of the time elapsed for radio waves to travel from the UE to the serving BS, known as Timing Advance (TA). Further, the value of the TA may be affected due to the change in the distance between the UE and the serving BS due to the movement of the UE. Mobility management techniques may be employed to assign, control, and manage devices, services, and infrastructure related to mobile communications to provide service continuity to moving UEs.

When a UE moves from a coverage area of one cell to another, a handover (HO) process is initiated in order to change a serving cell for the UE. Such mobility management has been handled based on layer 3 Radio Resource Channel (RRC). Extension of mobility to lower layers (L1/L2) is a crucial development in 3GPP. Layer 1/Layer 2 Triggered Mobility (LTM) has been adopted to enable UEs to change serving cell through Layer 1/Layer 2 signaling. For example, if the UE is moving from the coverage area of the serving cell to the coverage area of one of the neighboring cells, also referred to as target cell, the HO process is performed in which the UE needs to connect to the neighboring cell and disconnect from the serving cell.

However, it should be understood that the UE mobility may also be realized in a manner alternate to LTM, not discussed herein for the sake of brevity. In LTM, based on the UE movement and in order to perform handover from the serving cell to the target cell, the UE is required to obtain the knowledge of the TA related to the target cell for implementing the same and to continue communicating with the target cell. The knowledge of the TA is necessary for the UE to perform proper synchronization, also referred to as UL synchronization, and connection with the target cell.

5G advanced technology, for example, is configured with a disaggregated BS (or gNodeBs (gNB)) architecture defined for cellular network (as shown in FIG. 1). For example, a disaggregated Next Generation Node B (gNB) architecture is defined in 3rd Generation Partnership Project (3GPP) decomposing a gNB into multiple logical entities. For example, the gNB may include a gNB-Control Unit-Control Plane (CU-CP), gNB-Control Unit-User Plane (CU-UP) and the gNB Distributed Unit (DU). Likewise, a single DU may be responsible to host multiple cells. As an example, a single DU may be responsible to host a maximum of 512 cells in current 3GPP specifications. The gNB-CU-CP may host a Packet Data Convergence Protocol (PDCP-c) and a Radio Resource Control (RRC) layer, gNB-CU-UP may host a Packet Data Convergence Protocol (PDCP-u) and a Service Data Adaptation Protocol (SDAP) while the gNB-DU hosts a Radio Link Control (RLC), a Medium Access Control (MAC), and a Physical (PHY) layer. Herein, scheduling operation takes place at the gNB-DU. To support L1/L2 centric inter-cell change (i.e., change of serving cell) in the disaggregated gNB architecture effectively is crucial requirement.

The information disclosed in this background of the disclosure section is only for enhancement of understanding of the general background of the disclosure and should not be taken as an acknowledgment or any form of suggestion that this information forms prior art already known to a person skilled in the art.

SUMMARY

The present disclosure relates to an apparatus configured to receive, at a first network entity and from one of a second network entity and a third network entity, a configuration message comprising a Random Access Channel (RACH) preamble, to perform a RACH procedure with a fourth network entity to perform a network function. Further, the apparatus receives, at the first network entity and from the second network entity, a command to perform the network function. Furthermore, the apparatus is configured to perform, at the first network entity, the RACH procedure by transmitting a RACH request message including the RACH preamble. At least one of the RACH preamble format and the RACH request message may comprise an indicator, to the fourth network entity. Further, the indicator may be indicative of the network function. The apparatus is further configured to perform, at the first network entity, the network function based on the received command.

The present disclosure also relates to a method comprising the steps of receiving, at a first network entity and from one of a second network entity and a third network entity, a configuration message comprising a Random Access Channel (RACH) preamble, to perform RACH procedure with a fourth network entity to perform a network function. Further, the method comprises receiving, at the first network entity and from the second network entity, a command to perform the network function. Further, the method comprises performing, at the first network entity, the RACH procedure by transmitting a RACH request message including the RACH preamble. At least one of the RACH preamble format and the RACH request message comprises an indicator, to the fourth network entity. Further, the indicator may be indicative of the network function. The method further comprises performing, at the first network entity, the network function based on the received command.

Further, the present disclosure relates to an apparatus configured to receive, at a first network entity and from a third network entity, an LTM candidate cell configuration preparation request message. Further, the apparatus is configured to transmit, from the first network entity, an LTM candidate cell configuration including separate dedicated RACH preamble allocated for each network function, to at least one of the second network entity and a fourth network entity, to perform Random Access Procedure, by the second network entity with the first network entity, based on the dedicated RACH preamble allocated corresponding to the network function. Furthermore, the apparatus is configured to determine, at the first network entity, the network function to be performed by the second network entity, based on the dedicated RACH preamble. The apparatus is further configured to transmit, by the first network entity and to at least one of the second network entity and the fourth network entity, a response to perform the determined network function.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristics of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
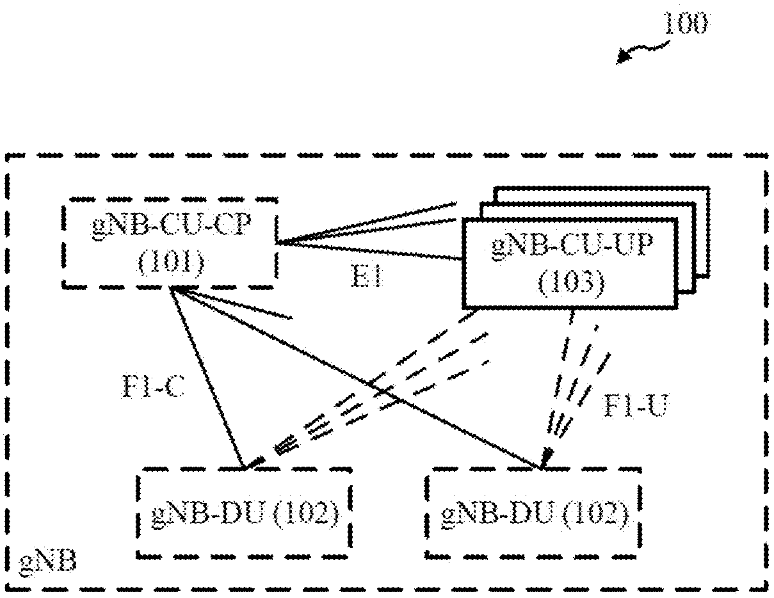
FIG. 1 illustrates an existing disaggregated gNB architecture.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION OF THE DISCLOSURE

It is to be understood that the present disclosure may assume various alternative variations and step sequences, except where expressly specified to the contrary. It is also to be understood that the specific devices and processes illustrated in the attached drawings and described in the following specification are simply exemplary and non-limiting embodiments or aspects. Hence, specific dimensions and other physical characteristics related to the embodiments or aspects disclosed herein are not to be considered as limiting.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms "an embodiment", "embodiment", "embodiments", "the embodiment", "the embodiments", "one or more embodiments", "some embodiments", and "one embodiment" mean "one or more (but not all) embodiments of the present disclosure" unless expressly specified otherwise.

The terms "including", "comprising", "having" and variations thereof mean "including but not limited to" unless expressly specified otherwise.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

In general, objectives of mobility management have been defined, wherein reduction of mobility latency and fast application of configuration for L1/L2 triggered Mobility (LTM) are crucial. In existing Handover (HO) technique, a UE waits for Physical Random Access Channel (PRACH) occasion and performs RACH to synchronize with Uplink (UL) of a target cell. This is necessary as the timing advance (TA) of the target cell (configured for HO) may be different from that of the serving cell. During the RACH procedure, the UE acquires the timing advance of the UE at the target cell. A person skilled in the art may understand that the timing advance is UE-specific and may be different for different UEs in a cell.

For LTM, in order to reduce user-plane interruption time during HO, it is adopted that the UE can be ordered by the serving gNB-DU (before the LTM serving cell change) using a PDCCH order to perform UL sync operation with a candidate/target gNB-DU. During this UL sync operation, the UE may transmit reserved Contention Free Random Access (CFRA) preamble during LTM candidate/target cell preparation to a candidate/target gNB-DU and procure the timing advance of the UE in the candidate/target cell. This Timing Advance (TA) of the UE in the candidate/target cell may be delivered from the candidate/target DU to the UE directly or to the gNB-CU and from gNB-CU to the serving gNB-DU via an F1 interface. The serving gNB-DU may use the acquired TA during the LTM cell switch to determine whether a RACH-less cell switch is performed. This helps the UEs to reduce latency during the handover since it avoids performing RACH during the actual LTM serving cell change, as the TA of the target cell is already available.

Conventionally, based on techniques adopted in Radio Layer (RAN1 and RAN2) for LTM, a RACH procedure may be used to acquire the TA of the candidate/target cell in advance to a LTM cell switch, while a UE is still connected to the serving cell. However, the RACH procedure performed by the UE to acquire the TA and used during a RACH-based LTM cell switch or other use-cases is same. Hence, it is infeasible to identify the purpose of the RACH procedure at a candidate/target gNB-DU which entails that appropriate actions cannot be carried out.

The methods and systems of the present disclosure solve a technical problem for implementing L1/L2 centric inter-cell change (i.e., change of serving cell) in the disaggregated gNB architecture. Herein, techniques or mechanism may be required such that configuration may take place at the gNB-CU-CP, while being executed autonomously by the gNB-DU without further interaction with upper layers. The present disclosure solves this technical problem as described in below embodiments.

Embodiments disclosed herein provide a method and system for enabling identification of RACH procedure at a candidate/target gNB-DU. For example, the present disclosure discloses a method of enabling differentiation of Random Access Channel (RACH) procedure performed for Timing Advance (TA) acquisition and Random Access Channel (RACH) procedure performed for a serving cell change and identification of Randon Access Channel (RACH) for acquisition of Timing Advance (TA) at a candidate/target gNB-DU. In an embodiment, the method of the present disclosure comprises modifying the RACH preamble format or Random Access Request message to indicate the intention of the RACH procedure. For example, a 1-bit indicator may be defined to be used in the RACH preamble of a Random-Access request message to indicate if the RACH is for acquiring a TA or for performing an LTM cell switch using the legacy RACH procedure. When the serving gNB-DU sends a PDCCH order to a UE to acquire the TA from a candidate/target cell, the UE may use the defined 1-bit indicator to indicate TA acquisition. Further, when the serving gNB-DU sends a downlink (DL) MAC Control Elements (CE) requesting the UE to perform a RACH-based LTM cell switch, the 1-bit indicator is used to indicate an LTM cell switch using the normal RACH procedure. This RACH-based LTM cell switch may be transmitted due to the occurrence of various conditions such as, but not limited to, failure in TA acquisition or expiry of a TA timer.

In another embodiment, the method of the present disclosure comprises allocating separate pools of dedicated RACH preambles in each candidate/target gNB-DU for acquiring a TA and for performing legacy RACH procedure. During an LTM candidate cell preparation, based on request from serving gNB-CU-CP, the method includes allocating separate RACH preambles for TA acquisition and RACH-based LTM cell switch. Thus, allocated dedicated preambles shall also be communicated to the UE in the LTM candidate cell configuration and indicated that the RACH preambles of one cannot be used for the other. Thus, depending on the RACH preamble being used, the candidate/target gNB-DU may determine if a UE is performing TA acquisition or performing RACH-based LTM cell switch procedure (for example, due to failure in TA acquisition or expiry of the TA timer).

Thus, the present disclosure enables the candidate/target gNB-DU to determine the purpose of the RACH procedure and take appropriate actions.

FIG. 1 illustrates an existing disaggregated gNB architecture. In an existing (or conventional) disaggregated gNB architecture, a conventional gNB 100 may be decomposed into multiple logical entities, as defined in 3GPP. For example, the conventional gNB 100 may include a gNB-Control Unit-Control Plane (CU-CP) 101 (gNB-Control Unit-Control Plane (CU-CP) and a gNB-Control Unit-User Plane (CU-UP) 103 (gNB-Control Unit-User Plane (CU-UP). CU-CP and CU-UP is also referred hereinafter as gNB-Centralized Unit (CU) for the sake of brevity) and the gNB DU 102. Likewise, a single DU 102 may be responsible to host multiple cells (not shown). As an example, a single DU 102 may be responsible to host a maximum of 512 cells in current 3GPP specifications. The gNB-CU-CP 101 may host a Packet Data Convergence Protocol (PDCP-c) and a Radio Resource Control (RRC) layer, while the gNB-DU 102 hosts a Radio Link Control (RLC), a Medium Access Control (MAC), and a Physical (PHY) layer. The scheduling operation takes place at the gNB-DU 102. In order to support L1/L2 centric inter-cell change, related to the changing of serving cell (not shown), in the disaggregated gNB architecture, a mechanism is implemented in which scheduling operation/configuration would take place at the gNB-CU-CP 101, but executed autonomously by the gNB-DU 102 without any further interaction with the upper layers. For example, the mechanism involves performing the handover preparation by the gNB-CU-CP 101, but autonomously executing the handover by the gNB-DU 102 without further interaction with upper layers, such as PDCP and the RRC layer.

Conventionally, the disaggregated gNB architecture may also include a logical node, such as a gNB-CU-User Plane (gNB-CU-UP) 103 to host user plane part of the PDCP-u protocol of the gNB-CU 101 and/or the Service Data Adaptation Protocol (SDAP) protocol. The gNB-CU-UP 103 terminates E1 interface connected with the gNB-CU-CP 101 and the F1-U interface connected with the gNB-DU 102.

In general, objectives of mobility management have been defined in 3GPP release 18, based on following principles:

(a) To specify mechanism and procedures of L1/L2 based inter-cell mobility for mobility latency reduction:
  - Configuration and maintenance for multiple candidate cells to allow fast application of configurations for candidate cells [RAN2, RAN3].
  - Dynamic switch mechanism among candidate serving cells (including SpCell and SCell) for the potential applicable scenarios based on L1/L2 signaling [RAN2, RAN1].

(b) L1 enhancements for inter-cell beam management, including L1 measurement and reporting, and beam indication [RAN1, RAN2].
  - Timing Advance management [RAN1, RAN2].
  - CU-DU interface signaling to support L1/L2 mobility, if needed [RAN3].

For example, FR2 specific enhancements may not be precluded, if any.

The procedure of L1/L2 based inter-cell mobility may be applicable to the following scenarios:

- Standalone, CA and NR-DC case with serving cell change within one CG.
- Intra-DU case and intra-CU inter-DU case (applicable for Standalone and CA: no new RAN interfaces are expected).
- Both intra-frequency and inter-frequency.
- Both FR1 and FR2.
- Source and target cells may be synchronized or non-synchronized.

The L1/L2 triggered mobility is a mobility feature and may be considered a basic UE capability. Thus, the above features, especially points (a) and (b), may indicate regarding reduction of mobility latency and fast application of configuration for Lower Layer Mobility (LLM) are crucial.

As per existing techniques, previously agreed/adopted principles in Radio Access Network 1 and 2 (RAN1 and RAN2) are defined below:

For PDCCH ordered RACH for candidate cell(s), RAR reception can be configured/indicated.

- In case reception of Random Access Response (RAR) is not configured/indicated (without RAR):
  - TA value of candidate cell is indicated in cell switch command.
  - From future perspective: whether UE should re-transmit PRACH when reception of RAR is not configured/indicated, and how UE determines the transmit power of subsequent PRACH triggered by PDCCH order.
- In case when reception of RAR is configured/indicated (with RAR):
  - whether RAR is received from-serving cell or candidate cell.
  - if RAR is received from candidate cell, whether Type1-PDCCH CSS of the candidate cell is configured to the UE content of RAR.
  - From future perspective, signaling for configuration/indication of whether RAR needs to be received.
- UE can report the support combination of with RAR only and without RAR only, where support of one default scheme is the baseline UE approach for LTM.
- Send LS to RAN2 and RAN3 to check the feasibility about this agreement.

Herein, based on the adopted technique, if reception of RAR is configured/indicated, RAR contains at least TA of candidate cell. The maximum number of TA values memorized by UE is a UE capability.

Therefore, based on techniques adopted in Radio Layer (RAN1 and RAN2) for LTM, a RACH procedure may be used to acquire the TA of the candidate/target cell in advance to a LTM cell switch, while a UE is still connected to the serving cell. However, the RACH procedure performed by the UE to acquire the TA of a candidate cell and used during a legacy handover scenario or other use-cases is same. Hence, it is infeasible to identify the purpose of the RACH procedure at a candidate/target gNB-DU which entails that appropriate actions cannot be carried out.

Figure 2:
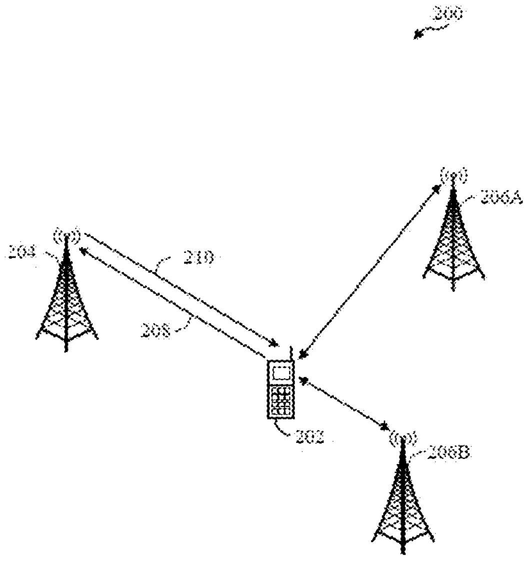
FIG. 2 illustrates a schematic representation of a RAR configuration for a UE 202, according to the embodiments as disclosed herein.

FIG. 2 illustrates a schematic representation 200 of a RAR configuration for a UE 202, according to the embodiments as disclosed herein. The UE 202 may be in communication with a serving cell 204 (also referred hereinafter as the serving base station 204 or the serving gNB-Distributed Unit (DU) 204 as the serving gNB-DU 204 may include one or more serving cell (not shown)). For PDCCH ordered RACH for candidate cell(s) 206A, 206B (also referred hereinafter as the candidate/target base station 206A, 206B or the target/candidate gNB-DU 206A, 206B as the target/candidate gNB-DU 206A, 206B may include one or more target/candidate cell 206A, 206B), the RAR reception is configured/indicated.

In an embodiment, at link 208, the UE 202 may send a target cell RSRP using L1 measurement report via link 208 to the serving cell 204. In an embodiment, at link 210, the serving cell 204 may configure the UE 202 using the PDCCH order to perform UL synchronization by sending the PRACH preamble, so that the UE 202 acquires the target cell TA.

In operation, in an embodiment, the UE 202 may receive, from the serving base station 204 or a serving base station central unit (gNB-CU), a message comprising a Random Access Channel (RACH) preamble, to perform a RACH procedure with the target base station distributed unit (target gNB-DU) OR a candidate base station distributed unit (candidate gNB-DU) to perform a network function. In an example, the UE 202 may receive the message comprising the RACH preamble from the candidate/target base station 206A, 206B. In said embodiment, the UE 202 may be a first network entity, the serving base station distributed unit (or the serving gNB DU or the serving base station 204) may be a second network entity, the serving base station central unit may be a third network entity, and one of the target base station distributed unit (also referred as a target gNB DU) and the candidate base station distributed unit (also referred as candidate gNB DU) may be the fourth network entity. In another example, one of the candidate/target base station 206A, 206B may be the fourth network entity. In an example, the UE 202 may receive, from the serving base station distributed unit, a command to perform the network function. In an embodiment, the command may be a PDCCH command for performing the TA acquisition function. In another embodiment, the command may be MAC CE command for performing a normal RACH function for LTM serving cell switch.

Further, the UE 202 may perform the RACH procedure by transmitting a RACH request message including the RACH preamble to the candidate/target base station 206A, 206B (functionality implemented by/on the candidate/target base station 206A, 206B may also be performed by/on the target base station distributed unit or the candidate base station distributed unit, however, the same may not be described hereinafter for the sake of brevity). In an example, at least one of the RACH preamble format and the RACH request message may include an indicator. In an example, the indicator may be a 1-bit indicator. For example, the indicator may be indicative of the network function. In an embodiment, the UE 202 may be configured to encode a value of the indicator based on the network function indicated in the configuration message. In an embodiment, the indicator may be indicative of the network function being a RACH procedure performed during a LTM serving cell switch function. For example, the serving cell switch function may include performing cell switching, associated with the UE 202, from the serving base station 204 to the candidate/target base station 206A, 206B.

In an embodiment, the indicator may be indicative of the network function being a Timing Advance (TA) acquisition function. Further, the TA acquisition function may include receiving, at the UE 202, a TA to perform the network function. For example, the TA may be a corresponding TA associated with an LTM candidate cell of the candidate/target base station 206A, 206B.

In an embodiment, the indicator may include allocation information indicative of a type of a RACH preamble, meant for a given network function or the RACH preamble indicates to the candidate/target gNB-DU, the purpose of the RACH procedure. In an embodiment, the RACH preamble may indicate a RACH preamble allocated for TA acquisition operation. In another embodiment, the RACH preamble may indicate a RACH preamble allocated for RACH-based LTM cell switch operation. For example, the RACH preamble type may be indicative to the candidate/target base station 206A, 206B, that the UE 202 is configured to perform the TA acquisition operation or the RACH-based LTM cell switch operation. In another embodiment, the indicator may include non-allocation information. For example, if the indicator includes the non-allocation information, the type of RACH preamble may be not indicative of the RACH preamble type for TA acquisition operation and the RACH preamble type for RACH-based LTM cell switch operation.

In an embodiment, the UE 202 may be configured to transmit to a first distributed unit (DU) of the serving base station 204, a measurement report (MR) associated with respective one or more signal and channel parameters of a plurality of LTM candidate cells 206A, 206B of one or more serving and neighboring base stations. In an example, the UE 202 may be configured to transmit, to the first DU, L1 MR associated with respective one or more signal and channel parameters of the plurality of candidate cells 206A, 206B associated with the first DU and one or more DUs associated with one or more neighbouring base stations. In an embodiment, the UE 202 may send Layer 1 (L1) MR to the serving gNB-DU 204 for the plurality of candidate cells 206A, 206B. In an example, the plurality of candidate cells may include a plurality of non-serving cells.

Further, upon receiving the L1 MR at the serving base station 204, the first DU of the serving base station 204 may determine a candidate cell of a target base station 206A, 206B from one or more DUs of one or more candidate base stations. NOTE: The candidate cell could belong to the same base station as the serving cell as well. In an embodiment, the target base station may be the serving base station. In another embodiment, the determination of the candidate cell may be based on one or more signal and channel parameters of a plurality of candidate cells of the one or more neighboring base stations. Based on the determination of the target base station 206A, 206B, the first DU may transmit a request, to the UE 202, to perform uplink synchronization to acquire TA of the determined candidate cell.

Accordingly, the UE 202 may receive a request from the first DU of the serving base station 204 to perform the uplink synchronization with the candidate cell of a second DU associated with the candidate/target base station 206A, 206B based on the RACH configuration indicated in the LTM candidate cell configuration sent to the UE in the RRC Reconfiguration message when the LTM candidate cell was prepared. Further, the UE 202 may perform the uplink synchronization by sending a Random Access Channel (RACH) request message to the second DU.

In an embodiment, from the perspective of the candidate/target base station 206A, 206B, the candidate/target base station 206A, 206B may receive from the UE, a Random Access Channel (RACH) request message, including a RACH preamble. In an example, the RACH preamble format may comprise an indicator indicative of a network function. For example, the indicator may be indicative of the network function being one of a LTM serving cell switch function and a Timing Advance (TA) acquisition function. In an embodiment, the indicator may be indicative of the network function being one of a LTM serving cell switch function and a Timing Advance (TA) acquisition function.

At the time of LTM candidate cell preparation, at the request of serving gNB-CU-CP, the candidate base station 206A, 206B may transmit an LTM candidate cell configuration including a common RACH preamble for the network functions, timing acquisition and RACH-based LTM cell switch to the UE, via the serving gNB-CU. Subsequently, when the serving gNB-DU issues a PDCCH order to the UE to perform UL sync and acquire timing advance from the candidate gNB-DU cell, the UE encodes the indicator in the RACH preamble format in the RACH Request message to indicate the network function as timing acquisition. When the serving gNB-DU sends a DL MAC CE to execute a RACH-based LTM cell switch, the UE encodes the indicator in the RACH preamble format in the RACH Request message to indicate the network function as RACH-based LTM cell switch. In an alternative embodiment, the candidate/target base station 206A, 206B may transmit an LTM candidate cell configuration including separate dedicated RACH preambles for the timing acquisition and RACH-based LTM cell switch respectively, to the UE 202, via the serving gNB-CU. In an embodiment, the candidate/target base station 206A, 206B may transmit the LTM candidate cell configuration to the UE 202 and indicate to perform Random Access Procedure, based on the type of RACH preamble corresponding to the network function. In an embodiment, the type of the RACH preamble is indicative of one of a RACH preamble for TA acquisition operation and a RACH preamble for RACH-based LTM cell switch operation. When the serving gNB-DU orders the UE to perform timing acquisition or LTM cell switch, the UE uses the corresponding RACH preamble allocated for the given network function.

In another embodiment, associated from the perspective of the candidate/target base station 206A, 206B, the target base station distributed unit and the candidate base station distributed unit (also referred hereinafter as the candidate/target base station distributed unit or the candidate/target base station 206A, 206B) may be a first network entity, the UE 202 may be a second network entity, the serving base station central unit may be the third network entity, and the serving base station distributed unit (or the serving base station 204) may be a fourth network entity.

In operation, as per an embodiment from the perspective of the candidate/target base station 206A, 206B, the candidate/target base station distributed unit may receive, from the serving base station central unit entity, an LTM candidate cell configuration preparation request message. Further, the candidate/target base station distributed unit may transmit an LTM candidate cell configuration to at least one of the UE 202 and the serving base station distributed unit. The LTM candidate cell configuration may include separate dedicated RACH preamble allocated for each network function, to perform Random Access Procedure, by the UE 202 with the candidate/target base station distributed unit, based on the dedicated RACH preamble allocated corresponding to the network function. Furthermore, the candidate/target base station distributed unit may determine the network function to be performed by the second network entity, based on the dedicated RACH preamble. The candidate/target base station distributed unit may then transmit a response to at least one of the UE 202 and the serving base station distributed unit, to perform the determined network function.

Figure 3:
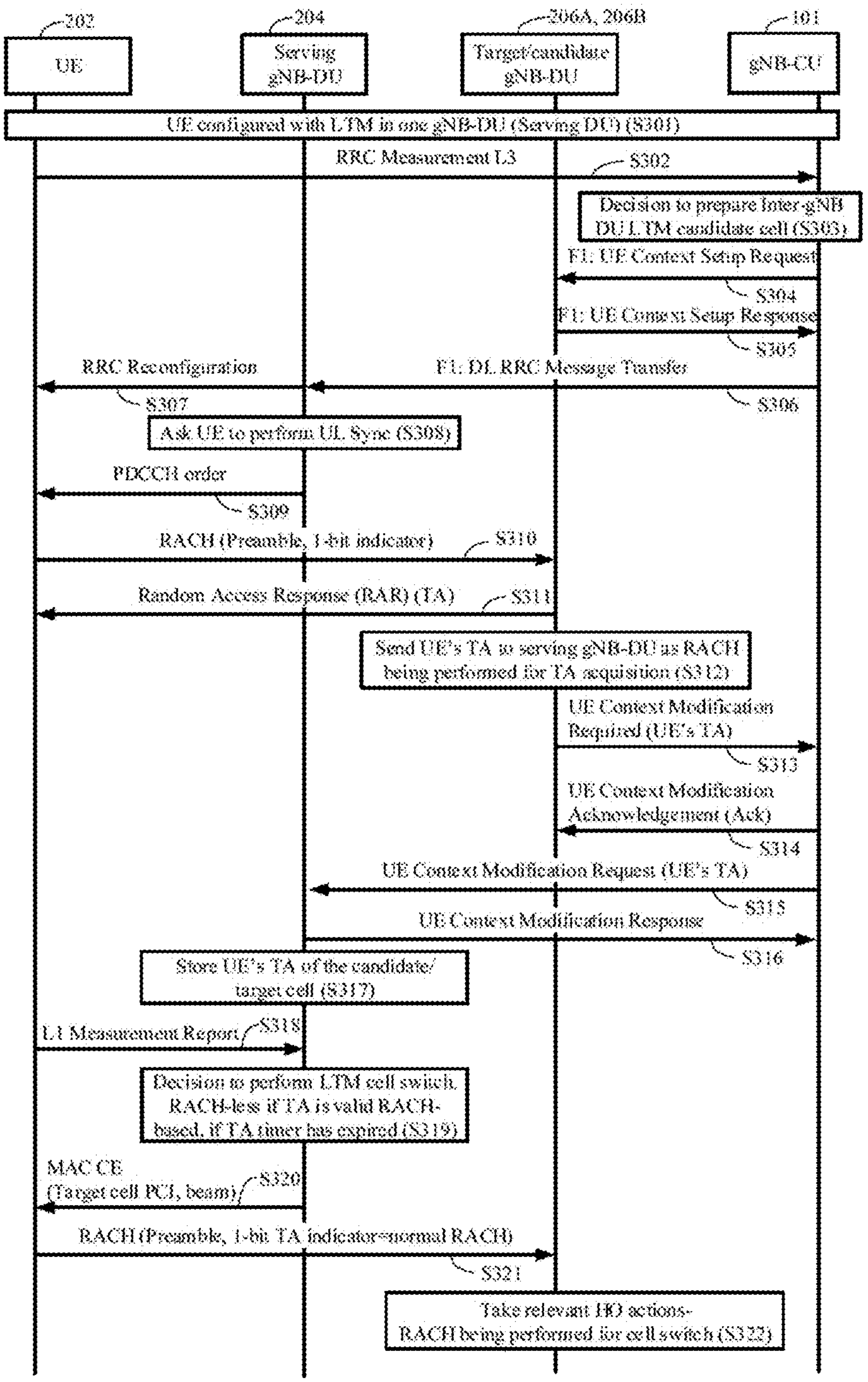
FIG. 3 is a sequence diagram illustrating a method of enabling identification of RACH procedure in first embodiment, according to the embodiments as disclosed herein.

FIG. 3 is a sequence diagram illustrating a method of enabling identification of RACH procedure in first embodiment, according to the embodiments as disclosed herein.

The sequence diagram may be described in the general context of computer executable instructions. Generally, computer executable instructions can include routines, programs, objects, components, data structures, procedures, modules, and functions, which perform specific functions or implement specific abstract data types.

The order in which the steps of the sequence diagram are described are not intended to be construed as a limitation, and any number of the described blocks of the sequence diagram can be combined in any order to implement the method illustrated in the sequence diagram. Additionally, individual blocks may be deleted from the methods without departing from the scope of the subject matter described herein. Furthermore, the method illustrated in the sequence diagram can be implemented in any suitable hardware, software, firmware, or combination thereof.

One or more steps of the LTM have been described below with the help of a candidate cell for ease of description, while it may be appreciated that the one or more steps may also be performed with one or more candidate cells.

FIG. 3 shows an interaction between the UE 202, the serving gNB-DU 204 (also referred hereinafter as the serving base station 204), the target/candidate gNB-DU (also referred hereinafter as the candidate/target base station 206A, 206B), and the gNB-Centralized Unit (CU) 101.

Referring to FIG. 3, at S301, the UE 202 is configured with LTM in one-gNB-DU (for example, the serving base station 204).

At step S302, the UE 202 uses the RRC connection with the gNB-CU 101 and sends L3 RRC measurements to the gNB-CU 101 on layer 3.

At step S303, the gNB-CU 101 decides to prepare the candidate/target base station 206A, 206B. In an example, the candidate/target base station 206A, 206B may be an inter-gNB DU LTM candidate cell.

At step S304, the gNB-CU 101 initiates the UE context setup request message to the candidate/target base station 206A, 206B through F1 interface, to prepare the candidate/target base station 206A, 206B.

At step S305, the candidate/target base station 206A, 206B acknowledges with UE context setup response message through F1 interface and provides the candidate/target cell configuration.

At step S306, the gNB-CU 101 sends DL RRC message transfer (RRC reconfiguration (LTM target cell configuration)) to the serving base station 204 through F1 interface.

At step S307, the RRC reconfiguration message is passed to the UE 202. The serving base station 204 checks the set of RRM criteria (for example: predefined RSRP threshold) set to trigger sending the L1 measurements to the candidate/target base station 206A, 206B.

At step S308, the UE 202 is indicated to perform an uplink synchronization with cells of the candidate/target base station 206A, 206B. In the above context, the UE 202 is configured to use a 1-bit indicator in Random Access request message to indicate if the RACH is for acquiring TA or for performing legacy RACH procedure.

At step S309, the serving base station 204 may send a PDCCH order to the UE 202 to acquire TA from the candidate/target base station 206A, 206B.

At step S310, the UE 202 may use the 1-bit indicator to indicate the TA acquisition.

At step S311, based on the RACH procedure, the candidate/target base station 206A, 206B may determine that RACH is performed for TA acquisition.

At step S312, the candidate/target base station 206A, 206B may transmit the TA of the UE 202 to the serving bases station 204.

At step S313, the candidate/target base station 206A, 206B may indicate, to the gNB-CU 101, that UE context modification (or TA) is required.

At step S314, accordingly, based on the step 313, the gNB-CU 101 may send a UE context modification acknowledge message to the candidate/target base station 206A, 206B.

At step S315, the gNB-CU 101 may send UE context modification request to the serving base station 204.

At step S316, the serving base station 204 may send a UE context modification response to the gNB-CU 101 based on the UE context modification request.

At step S317, the serving base station 204 may store the TA of the candidate/target base station 206A, 206B.

At step S318, the UE 202 may perform measurement configuration on layer 1.

At step S319, based on the measurement configuration on layer 1, serving base station 204 may take a decision to perform an LTM cell switch function.

At step S320, the serving base station 204 may send a DL MAC CE indicating the UE 202 to perform a RACH-based LTM cell switch (for example, due to failure in TA acquisition or expiry of TA timer).

At step S321, the UE 202 may use the 1-bit indicator and transmits the preamble including the indicator to the candidate/target base station 206A, 206B to indicate normal RACH.

At step S322, the candidate/target base station 206A, 206B may determine that the RACH is being performed for LTM cell switch and accordingly performs appropriate handover actions.

Figure 4:
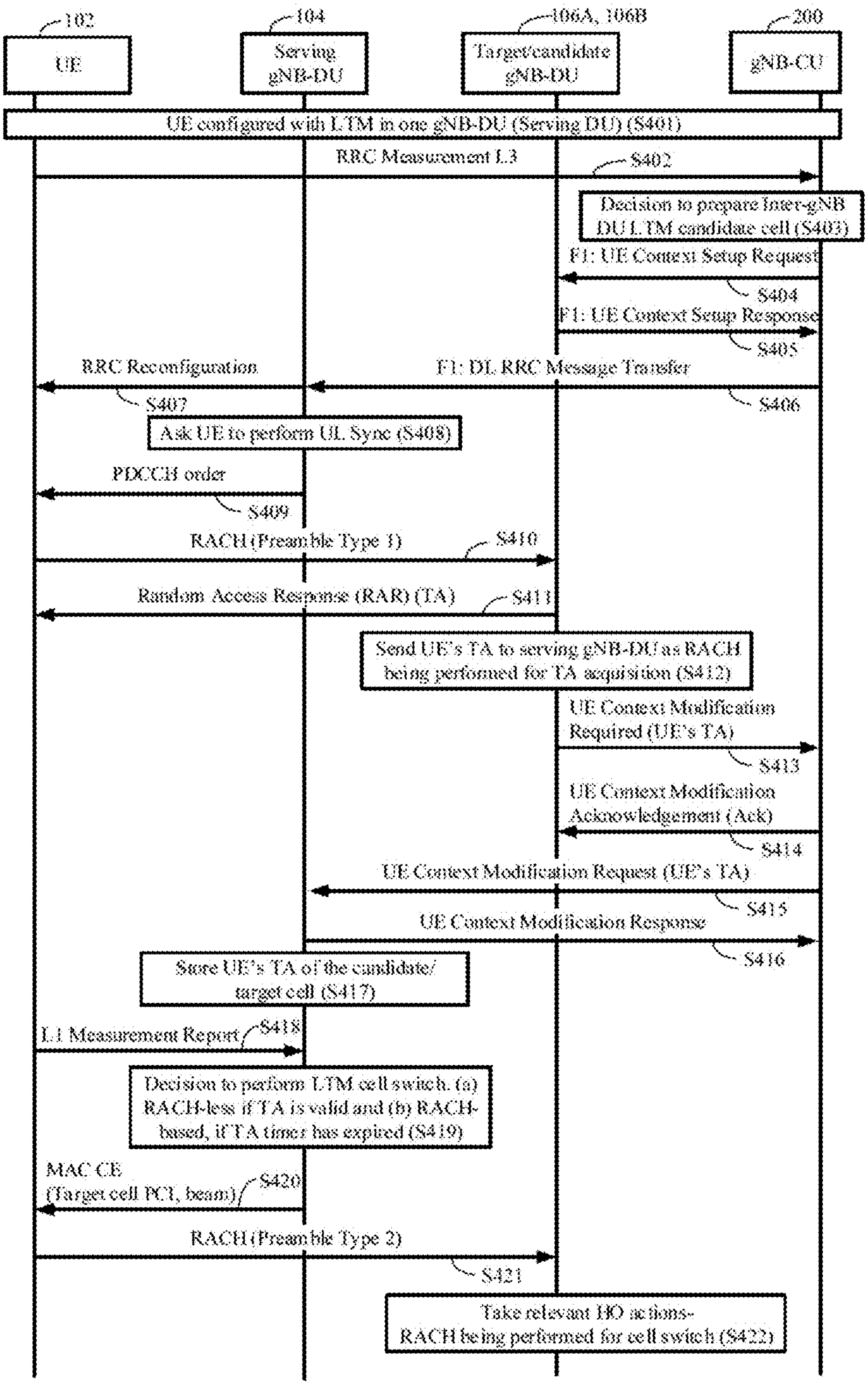
FIG. 4 is a sequence diagram illustrating a method of enabling identification of RACH procedure in second embodiment, according to the embodiments as disclosed herein.

FIG. 4 is a sequence diagram illustrating a method of enabling identification of RACH procedure in second embodiment, according to the embodiments as disclosed herein.

The sequence diagram may be described in the general context of computer executable instructions. Generally, computer executable instructions can include routines, programs, objects, components, data structures, procedures, modules, and functions, which perform specific functions or implement specific abstract data types.

The order in which the steps of the sequence diagram are described are not intended to be construed as a limitation, and any number of the described blocks of the sequence diagram can be combined in any order to implement the method illustrated in the sequence diagram. Additionally, individual blocks may be deleted from the methods without departing from the scope of the subject matter described herein. Furthermore, the method illustrated in the sequence diagram can be implemented in any suitable hardware, software, firmware, or combination thereof.

FIG. 4 shows an interaction between the UE 202, the serving gNB-DU 204 (also referred hereinafter as the serving base station 204), the target/candidate gNB-DU (also referred hereinafter as the candidate/target base station 206A, 206B, and the gNB-Centralized Unit (CU) 101.

Referring to FIG. 4, at S401, the UE 202 is configured with LTM in one-gNB-DU (for example, the serving base station 204).

At step S402, the UE 202 uses the RRC connection with the gNB-CU 101 and sends L3 RRC measurements to the gNB-CU 101 on layer 3.

At step S403, the gNB-CU 101 decides to prepare the candidate/target base station 206A, 206B. In an example, the candidate/target base station 206A, 206B may be an inter-gNB DU LTM candidate cell.

At step S404, the gNB-CU 101 initiates the UE context setup request message to the candidate/target base station 206A, 206B through F1 interface, to prepare an inter-DU LTM candidate cell.

At step S405, the candidate/target base station 206A, 206B acknowledges with UE context setup response message through F1 interface and provides the candidate/target cell configuration.

At step S406, the gNB-CU 101 sends DL RRC message transfer (RRC reconfiguration (LTM target cell configuration)) to the serving base station 204 through F1 interface.

At step S407, the RRC reconfiguration message is passed to the UE 202 by providing LTM cell configuration details (RACH preambles for TA acquisition and/or RACH-based LTM cell switch).

At step S408, the UE 202 is indicated to perform an uplink synchronization with cells of the candidate/target base station 206A, 206B. In the above context, based on request from gNB-CU 101, the serving base station 204 may be configured to allocate separate RACH preambles for TA acquisition and RACH-based LTM cell switch. In another example, the candidate/target base station 206A, 206B may be configured to allocate separate RACH preambles for TA acquisition and RACH-based LTM cell switch.

At step S409, the serving base station 204 may send a PDCCH order to the UE 202 to acquire TA from the candidate/target base station 206A, 206B indicated with a preamble type 1.

At step S410, the UE 202 may initiate RACH procedure using the preamble type 1 indicative of the TA acquisition. In this context, depending on the RACH preamble being used, the candidate/target base station 206A, 206B may determine if the UE 202 is performing TA acquisition or performing RACH-based LTM cell switch procedure (for example, due to failure in TA acquisition or expiry of the TA timer).

At step S411, based on the RACH procedure, the candidate/target base station 206A, 206B may determine that RACH is performed for TA acquisition based on the preamble type 1.

At step S412, the candidate/target base station 206A, 206B may transmit the TA of the UE 202 to the serving bases station 204.

At step S413, the candidate/target base station 206A, 206B may indicate to the gNB-CU 101, that UE context modification (or TA) is required.

At step S414, accordingly, based on the step 313, the gNB-CU 101 may send a UE context modification acknowledge message to the candidate/target base station 206A, 206B.

At step S415, the gNB-CU 101 may send UE context modification request to the serving base station 204.

At step S416, the serving base station 204 may send a UE context modification response to the gNB-CU 101 based on the UE context modification request.

At step S417, the serving base station 204 may store the TA of the candidate/target base station 206A, 206B.

At step S418, the UE 202 may perform measurement configuration on layer 1.

At step S419, based on the measurement configuration on layer 1, the serving base station 204 may take a decision to perform an LTM cell switch function. For example, the serving base station 204 may take a decision to perform a RACH-less LTM cell switch function if TA is valid and RACH-based LTM cell switch function if TA timer has expired.

At step S420, the serving base station 204 may send a DL MAC CE indicating the UE 202 to perform a LTM cell switch.

At step S421, the UE 202 may use the preamble type 2, indicative of a normal RACH function, to perform the LTM cell switch function to the candidate/target base station 206A, 206B.

At step S422, the candidate/target base station 206A, 206B may determine that the RACH is being performed for LTM cell switch and accordingly performs appropriate handover actions.

Figure 5:
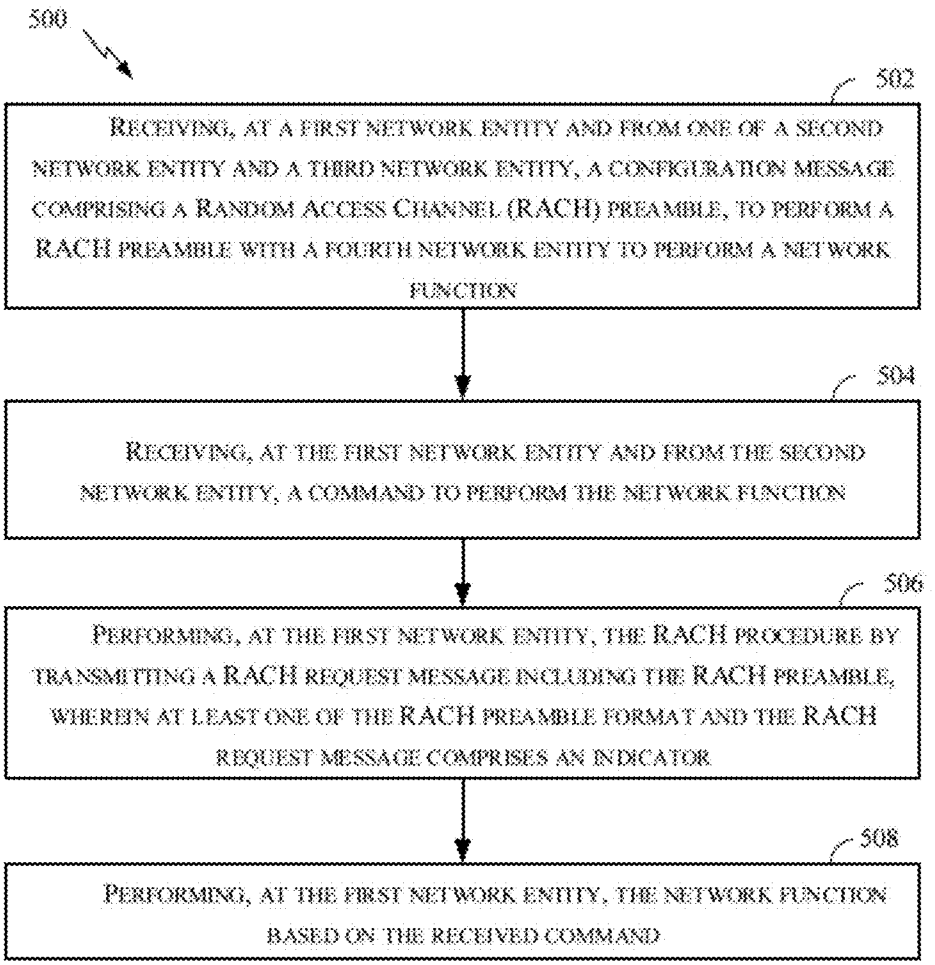
FIG. 5 illustrates a flowchart of a method for enabling identification of RACH procedure at a candidate/target gNB-DU, according to the embodiments as disclosed herein.

FIG. 5 illustrates a flowchart of a method for enabling identification of RACH procedure at a candidate/target gNB-DU, according to the embodiments as disclosed herein.

As illustrated in FIG. 5, the method 500 may comprise one or more steps. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 502, the UE 202 may receive, from the serving base station distributed unit (or serving gNB-DU) 204 or from the serving base station central unit (gNB-CU), a configuration message comprising a Random Access Channel (RACH) preamble, to perform a RACH procedure with the candidate/target base station 206A, 206B (or the distributed unit (target gNB-DU) OR a candidate base station distributed unit (candidate gNB-DU)) to perform a network function. In said embodiment, the UE 202 may be a first network entity, the serving base station 204 (or the serving base station distributed unit) may be a second network entity, a serving base station central unit may be the third network entity, and one of the target base station distributed unit and the candidate base station distributed unit (or candidate/target base station 206A, 206B) may be a fourth network entity.

At step 504, the UE 202 may receive, from the serving base station distributed unit (or the serving gNB-DU or the serving base station 204), a command to perform the network function. In an embodiment, the command may be a PDCCH command for performing the TA acquisition function. In another embodiment, the command may be MAC CE command for performing a normal RACH function for LTM serving cell switch.

At step 506, the UE 202 may perform the RACH procedure by transmitting a RACH request message including the RACH preamble to the target base station distributed unit (target gNB-DU) OR a candidate base station distributed unit (candidate gNB-DU) (or the candidate/target base station 206A, 206B). In an example, at least one of the RACH preamble format and the RACH request message may include an indicator. In an example, the indicator may be indicative of the network function. In an embodiment, the UE 202 may be configured to encode a value of the indicator based on the network function indicated in the configuration message. In an embodiment, the indicator may be indicative of the network function being a RACH procedure performed during an LTM serving cell switch function. For example, the serving cell switch function may include performing cell switching, associated with the UE 202, from the serving base station 204 to the target base station distributed unit (target gNB-DU) OR a candidate base station distributed unit (candidate gNB-DU) (or the candidate/target base station 206A, 206B).

In an embodiment, the indicator may be indicative of the network function being a Timing Advance (TA) acquisition function. Further, the TA acquisition function may include applying, at the UE 202, a TA based on the command to perform the network function. For example, the TA may be a corresponding TA associated with an LTM candidate cell of the target base station distributed unit (target gNB-DU) OR a candidate base station distributed unit (candidate gNB-DU) (or the candidate/target base station 206A, 206B).

In an embodiment, the indicator may include allocation information indicative of a type of a RACH preamble. In an embodiment, the allocation information may be indicative of the type of RACH preamble. In an example, the type of RACH preamble comprises a RACH preamble for TA acquisition operation. In another example, the type of RACH preamble comprises a RACH preamble for RACH-based LTM cell switch operation.

In an embodiment, the RACH preamble type for TA acquisition operation may be indicative to the target base station distributed unit (target gNB-DU) OR a candidate base station distributed unit (candidate gNB-DU) (or the candidate/target base station 206A, 206B) that the UE 202 is configured to perform TA acquisition operation. In an example, the RACH preamble type for RACH-based LTM cell switch operation is indicative to the target base station distributed unit (target gNB-DU) OR a candidate base station distributed unit (candidate gNB-DU) (or the candidate/target base station 206A, 206B) that the UE 202 is configured to perform RACH-based LTM cell switch operation.

At step 508, the UE 202 may perform the network function based on the received command.

Figure 6:
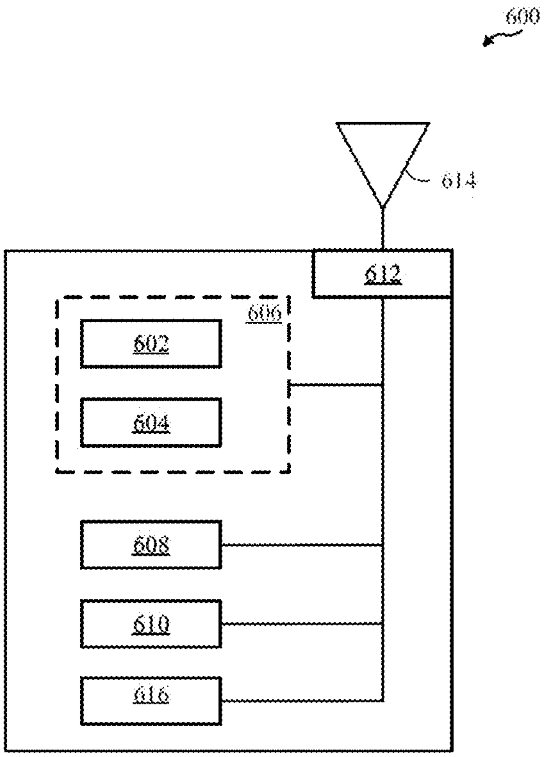
FIG. 6 illustrates a detailed block diagram of an apparatus wherein the method for enabling identification of RACH procedure at a candidate/target gNB-DU may be implemented, according to the embodiments as disclosed herein.

FIG. 6 illustrates a detailed block diagram of an apparatus 600 wherein the method for enabling identification of RACH procedure at the candidate/target gNB-DU 206A, 206B may be implemented. In one embodiment it will be appreciated that the apparatus 600 is associated with the UE 202. In another embodiment it will be appreciated that the apparatus 600 is associated with the serving base station 204. In yet another embodiment it will be appreciated that the apparatus 600 is associated with the candidate/target base station 206A, 206B or the target/candidate gNB-DU 206A, 206B. The apparatus 600 may comprise at least one transmitter 602, at least one receiver 604, at least one processor 608, at least one memory 610, at least one interface 612, and at least one antenna 614. The at least one transmitter 602 may be configured to transmit data/information to one or more nodes/devices using the antenna 614 and the at least one receiver 604 may be configured to receive data/information from the one or more nodes/devices using the antenna 614. The at least one transmitter 602 and receiver 604 may be collectively implemented as a single transceiver module 606. In one non-limiting embodiment, the at least one processor 608 may be communicatively coupled with the transceiver module 606, memory 610, interface 612, and antenna 614 for implementing the above-described technique of processing the wireless communication and specifically performing identification of RACH procedure.

The at least one processor 608 may include, but not restricted to, one or more of microprocessors, microcomputers, micro-controllers, central processing units, state machines, logic circuitries, and any devices that manipulate signals based on operational instructions. A processor may also be implemented as a combination of computing devices, e.g., a combination of a plurality of microprocessors or any other such configuration. The at least one memory 610 may be communicatively coupled to the at least one processor 608 and may comprise various instructions, the UE signal strength data, the initial bandwidth part, the one or more dedicated bandwidth parts, the pre-defined intervals, and the like. The at least one memory 610 may include one or more of a Random-Access Memory (RAM) unit and a non-volatile memory unit such as a Read Only Memory (ROM), optical disc drive, magnetic disc drive, flash memory, Electrically Erasable Read Only Memory (EEPROM), a memory space on a server or cloud and so forth. The at least one processor 608 may be configured to execute one or more instructions stored in the memory 610.

The interfaces 612 may include a variety of software and hardware interfaces, for example, a web interface, a graphical user interface, an Input Device-Output Device (I/O) interface, a network interface, and the like. The I/O interfaces may allow the apparatus 600 to communicate with one or more nodes/devices either directly or through other devices. The network interface may allow the apparatus 600 to interact with one or more networks either directly or via any other network.

The apparatus 600 may further include a RACH procedure identification module 616 to identify a RACH procedure.

In an embodiment [1], an apparatus is configured to: receive, at a first network entity and from one of a second network entity and a third network entity, a configuration message comprising a Random Access Channel (RACH) preamble, to perform a RACH procedure with a fourth network entity to perform a network function; receive, at the first network entity and from the second network entity, a command to perform the network function; perform, at the first network entity, the RACH procedure by transmitting a RACH request message including the RACH preamble, wherein at least one of the RACH preamble format and the RACH request message comprises an indicator, to the fourth network entity, wherein the indicator is indicative of the network function; and perform, at the first network entity, the network function based on the received command.

In an embodiment [2], in the apparatus described in the embodiment [1], the first network entity is configured to encode a value of the indicator based on the network function indicated in the configuration message.

In an embodiment [3], in the apparatus described in the embodiment [1], the indicator is indicative of the network function being a RACH procedure performed during an LTM serving cell switch function, wherein the LTM serving cell switch function comprises performing cell switching, associated with the first network entity, from the second network entity to the fourth network entity.

In an embodiment [4], in the apparatus described in the embodiment [1], the indicator is indicative of the network function being a Timing Advance (TA) acquisition function, wherein the TA acquisition function comprises receiving, at the first network entity, a TA to perform the network function, and wherein the TA is a corresponding TA associated with a LTM candidate cell of the fourth network entity.

In an embodiment [5], in the apparatus described in the embodiment [1], the indicator comprises allocation information indicative of a type of a RACH preamble, wherein the type of RACH preamble comprises one of a RACH preamble type for TA acquisition operation and a RACH preamble type for RACH-based LTM cell switch operation, and wherein: the RACH preamble type is indicative to the fourth network entity that the first network entity is configured to perform one of the TA acquisition operation and the RACH-based LTM cell switch operation.

In an embodiment [6], in the apparatus described in the embodiment [1], the indicator comprises non-allocation information pertaining to the RACH preamble, and the type of RACH preamble is not indicative of a RACH preamble type for TA acquisition operation and a RACH preamble type for RACH-based LTM cell switch operation.

In an embodiment [7], in the apparatus, described in the embodiment [1], the command is one of a Physical downlink control channel (PDCCH) command for performing the Timing Advance (TA) acquisition function, or a Medium Access Control (MAC) Control Elements (CE) command for performing a normal RACH function for a Layer 1/Layer 2 Triggered Mobility (LTM) serving cell switch.

In an embodiment [8], in the apparatus described in the embodiment [1], the first network entity is a user equipment, the second network entity is a serving base station distributed unit (serving gNB-DU), the third network entity is a serving base station central unit (gNB-CU), and the fourth network entity is one of a target base station distributed unit (target gNB-DU) and a candidate base station distributed unit (candidate gNB-DU).

In an embodiment [9], a method comprising: receiving, at a first network entity and from one of a second network entity and a third network entity, a configuration message comprising a Random Access Channel (RACH) preamble, to perform a RACH procedure with a fourth network entity to perform a network function; receiving, at the first network entity and from the second network entity, a command to perform the network function; performing, at the first network entity, the RACH procedure by transmitting a RACH request message including the RACH preamble, wherein at least one of the RACH preamble format and the RACH request message comprises an indicator, to the fourth network entity, wherein the indicator is indicative of the network function; and performing, at the first network entity, the network function based on the received command.

In an embodiment [10], in the method described in the embodiment [9], the first network entity is configured to encode a value of the indicator based on the network function indicated in the configuration message.

In an embodiment [11], in the method described in the embodiment [9], the indicator is indicative of the network function being a RACH procedure performed during an LTM serving cell switch function, wherein the serving cell switch function comprises performing cell switching, associated with the first network entity, from the second network entity to the fourth network entity.

In an embodiment [12], in the method described in the embodiment [9], the indicator is indicative of the network function being a Timing Advance (TA) acquisition function, wherein the TA acquisition function comprises receiving, at the first network entity, a TA to perform the network function, and wherein the TA is a corresponding TA associated with a LTM candidate cell of the fourth network entity.

In an embodiment [13], in the method described in the embodiment [9], the indicator comprises allocation information indicative of a type of a RACH preamble, wherein the type of RACH preamble comprises one of a RACH preamble type for TA acquisition operation and a RACH preamble type for RACH-based LTM cell switch operation, and wherein: the RACH preamble type is indicative to the fourth network entity that the first network entity is configured to perform one of the TA acquisition operation and the RACH-based LTM cell switch operation.

In an embodiment [14], in the method described in the embodiment [13], the indicator comprises non-allocation information pertaining to the RACH preamble.

In an embodiment [15], in the method described in the embodiment [9], the command is one of a Physical downlink control channel (PDCCH) command for performing the Timing Advance (TA) acquisition function, or a Medium Access Control (MAC) Control Elements (CE) command for performing a normal RACH function for a Layer 1/Layer 2 Triggered Mobility (LTM) serving cell switch.

In an embodiment [16], in the apparatus described in the embodiment [9], the first network entity is a user equipment, the second network entity is a serving base station distributed unit (serving gNB-DU), the third network entity is a serving base station central unit (gNB-CU), and the fourth network entity is one of a target base station distributed unit (target gNB-DU) and a candidate base station distributed unit (candidate gNB-DU).

In an embodiment [17], an apparatus is configured to: receive, at a first network entity and from a third network entity, an LTM candidate cell configuration preparation request message; transmit, from the first network entity, an LTM candidate cell configuration including separate dedicated RACH preamble allocated for each network function, to at least one of the second network entity and a fourth network entity, to perform Random Access Procedure, by the second network entity with the first network entity, based on the dedicated RACH preamble allocated corresponding to the network function; determine, at the first network entity, the network function to be performed by the second network entity, based on the dedicated RACH preamble; and transmit, by the first network entity and to at least one of the second network entity and the fourth network entity, a response to perform the determined network function.

In an embodiment [18], in the apparatus described in the embodiment [17], the dedicated RACH preamble is indicative of one of a RACH preamble for TA acquisition operation and a RACH preamble for RACH-based LTM cell switch operation.

In an embodiment [19], in the apparatus described in the embodiment [17], the network function is one of a LTM serving cell switch function and a Timing Advance (TA) acquisition function.

In an embodiment [20], in the apparatus described in the embodiment [17], the first network entity is one of a target base station distributed unit and a candidate base station distributed unit, the second network entity is a user equipment, and the fourth network entity is a serving base station distributed unit, and the third network entity is a serving base station central unit.

In an embodiment [21], a non-transitory computer-readable medium having program instructions stored thereon, executed by an apparatus for wireless communication at the UE 202, is disclosed. The program instructions may comprise: receiving, at a first network entity and from one of a second network entity and a third network entity, a configuration message comprising a Random Access Channel (RACH) preamble, to perform a RACH procedure with a fourth network entity to perform a network function; receiving, at the first network entity and from the second network entity, a command to perform the network function; performing, at the first network entity, the RACH procedure by transmitting a RACH request message including the RACH preamble, wherein at least one of the RACH preamble format and the RACH request message comprises an indicator, to the fourth network entity, wherein the indicator is indicative of the network function; and performing, at the first network entity, the network function based on the received command.

In an embodiment [22], a non-transitory computer-readable medium having program instructions stored thereon, executed by an apparatus for wireless communication at a candidate/target base station 206A, 206B, is disclosed. The program instructions may comprise: receive, at a first network entity and from a third network entity, an LTM candidate cell configuration preparation request message; transmit, from the first network entity, an LTM candidate cell configuration including separate dedicated RACH preamble allocated for each network function, to at least one of the second network entity and a fourth network entity, to perform Random Access Procedure, by the second network entity with the first network entity, based on the dedicated RACH preamble allocated corresponding to the network function; determine, at the first network entity, the network function to be performed by the second network entity, based on the dedicated RACH preamble; and transmit, by the first network entity and to at least one of the second network entity and the fourth network entity, a response to perform the determined network function.

In a non-limiting embodiment of the present disclosure, one or more non-transitory computer-readable media may be utilized for implementing the embodiments consistent with the present disclosure. A computer-readable medium refers to any type of physical memory (such as the memory 610) on which information or data readable by a processor may be stored. Thus, a computer-readable media may store one or more instructions for execution by the at least one processor 608, including instructions for causing the at least one processor 608 to perform steps or stages consistent with the embodiments described herein. The term "computer-readable media" should be understood to include tangible items and exclude carrier waves and transient signals. By way of example, and not limitation, such computer-readable media can comprise Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Thus, certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

The various illustrative logical blocks, modules, and operations described in connection with the present disclosure may be implemented or performed with a general-purpose processor, discrete gate or transistor logic, discrete hardware components or any combination thereof designed to perform the functions described herein. A general-purpose processor may include a microprocessor, but in the alternative, the processor may include any commercially available processor, controller, microcontroller, or state machine. A processor may also be implemented as a combination of computing devices, e.g., a plurality of microprocessors, or any other such configuration.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

I claim:

1. An apparatus configured to:

receive, at a first network entity and from one of a second network entity and a third network entity, a configuration message comprising a Random Access Channel (RACH) preamble, to perform a RACH procedure with a fourth network entity to perform a network function;

receive, at the first network entity and from the second network entity, a command to perform the network function;

perform, at the first network entity, the RACH procedure by transmitting a RACH request message including the RACH preamble, wherein at least one of the RACH preamble format and the RACH request message comprises an indicator, to the fourth network entity, wherein the indicator is indicative of the network function; and perform, at the first network entity, the network function based on the received command.

2. The apparatus as claimed in claim 1, wherein the first network entity is configured to encode a value of the indicator based on the network function indicated in the configuration message.

3. The apparatus as claimed in claim 1, wherein the indicator is indicative of the network function being a RACH procedure performed during an Layer 1/Layer 2 Triggered Mobility (LTM) serving cell switch function, wherein the LTM serving cell switch function comprises performing cell switching, associated with the first network entity, from the second network entity to the fourth network entity.

4. The apparatus as claimed in claim 1, wherein the indicator is indicative of the network function being a Timing Advance (TA) acquisition function, wherein the TA acquisition function comprises receiving, at the first network entity, a TA to perform the network function, and wherein the TA is a corresponding TA associated with a LTM candidate cell of the fourth network entity.

5. The apparatus as claimed in claim 1, wherein the indicator comprises allocation information indicative of a type of a RACH preamble, wherein the type of RACH preamble comprises one of a RACH preamble type for TA acquisition operation and a RACH preamble type for RACH-based LTM cell switch operation, and wherein:

the RACH preamble type is indicative to the fourth network entity that the first network entity is configured to perform one of the TA acquisition operation and the RACH-based LTM cell switch operation.

6. The apparatus as claimed in claim 1, wherein the indicator comprises non-allocation information pertaining to the RACH preamble, and the type of RACH preamble is not indicative of a RACH preamble type for TA acquisition operation and a RACH preamble type for RACH-based LTM cell switch operation.

7. The apparatus as claimed in claim 1, wherein the command is one of a Physical downlink control channel (PDCCH) command for performing the Timing Advance (TA) acquisition function, or a Medium Access Control (MAC) Control Elements (CE) command for performing a normal RACH function for a Layer 1/Layer 2 Triggered Mobility (LTM) serving cell switch.

8. The apparatus as claimed in claim 1, wherein the first network entity is a user equipment, the second network entity is a serving base station distributed unit, the third network entity is a serving base station central unit, and the fourth network entity is one of a target base station distributed unit and a candidate base station distributed unit.

9. A method comprising:

receiving, at a first network entity and from one of a second network entity and a third network entity, a configuration message comprising a Random Access Channel (RACH) preamble, to perform a RACH procedure with a fourth network entity to perform a network function;

receiving, at the first network entity and from the second network entity, a command to perform the network function;

performing, at the first network entity, the RACH procedure by transmitting a RACH request message including the RACH preamble, wherein at least one of the RACH preamble format and the RACH request message comprises an indicator, to the fourth network entity, wherein the indicator is indicative of the network function; and performing, at the first network entity, the network function based on the received command.

10. The method as claimed in claim 9, wherein the first network entity is configured to encode a value of the indicator based on the network function indicated in the configuration message.

11. The method as claimed in claim 9, wherein the indicator is indicative of the network function being a RACH procedure performed during an LTM serving cell switch function, wherein the serving cell switch function comprises performing cell switching, associated with the first network entity, from the second network entity to the fourth network entity.

12. The method as claimed in claim 9, wherein the indicator is indicative of the network function being a Timing Advance (TA) acquisition function, wherein the TA acquisition function comprises receiving, at the first network entity, a TA to perform the network function, and wherein the TA is a corresponding TA associated with a LTM candidate cell of the fourth network entity.

13. The method as claimed in claim 9, wherein the indicator comprises allocation information indicative of a type of a RACH preamble, wherein the type of RACH preamble comprises one of a RACH preamble type for TA acquisition operation and a RACH preamble type for RACH-based LTM cell switch operation, and wherein:

the RACH preamble type is indicative to the fourth network entity that the first network entity is configured to perform one of the TA acquisition operation and the RACH-based LTM cell switch operation.

14. The method as claimed in claim 13, wherein the indicator comprises non-allocation information pertaining to the RACH preamble.

15. The method as claimed in claim 9, wherein the command is one of a Physical downlink control channel (PDCCH) command for performing the Timing Advance (TA) acquisition function, or a Medium Access Control (MAC) Control Elements (CE) command for performing a normal RACH function for a Layer 1/Layer 2 Triggered Mobility (LTM) serving cell switch.

16. The method as claimed in claim 9, wherein the first network entity is a user equipment, the second network entity is a serving base station distributed unit, the third network entity is a serving base station central unit, and the fourth network entity is one of a target base station distributed unit and a candidate base station distributed unit.

17. An apparatus configured to:

receive, at a first network entity and from a third network entity, an LTM candidate cell configuration preparation request message;

transmit, from the first network entity, an LTM candidate cell configuration including separate dedicated RACH preamble allocated for each network function, to at least one of the second network entity and a fourth network entity, to perform Random Access Procedure, by the second network entity with the first network entity, based on the dedicated RACH preamble allocated corresponding to the network function;

determine, at the first network entity, the network function to be performed by the second network entity, based on the dedicated RACH preamble; and transmit, by the first network entity and to at least one of the second network entity and the fourth network entity, a response to perform the determined network function.

18. The apparatus as claimed in claim 17, wherein the dedicated RACH preamble is indicative of one of a RACH preamble for TA acquisition operation and a RACH preamble for RACH-based LTM cell switch operation.

19. The apparatus as claimed in claim 17, wherein the network function is one of a LTM serving cell switch function and a Timing Advance (TA) acquisition function.

20. The apparatus as claimed in claim 17, wherein the first network entity is one of a target base station distributed unit and a candidate base station distributed unit, the second network entity is a user equipment, the third network entity is a serving base station central unit, and the fourth network entity is a serving base station distributed unit.

* * * * *